July 20, 1954  W. H. NEWELL  2,684,007
GYROSCOPICALLY CONTROLLED OPTICAL MECHANISM
Filed Sept. 23, 1943  2 Sheets-Sheet 1

INVENTOR
WILLIAM H. NEWELL
Victor D. Borst
ATTORNEY

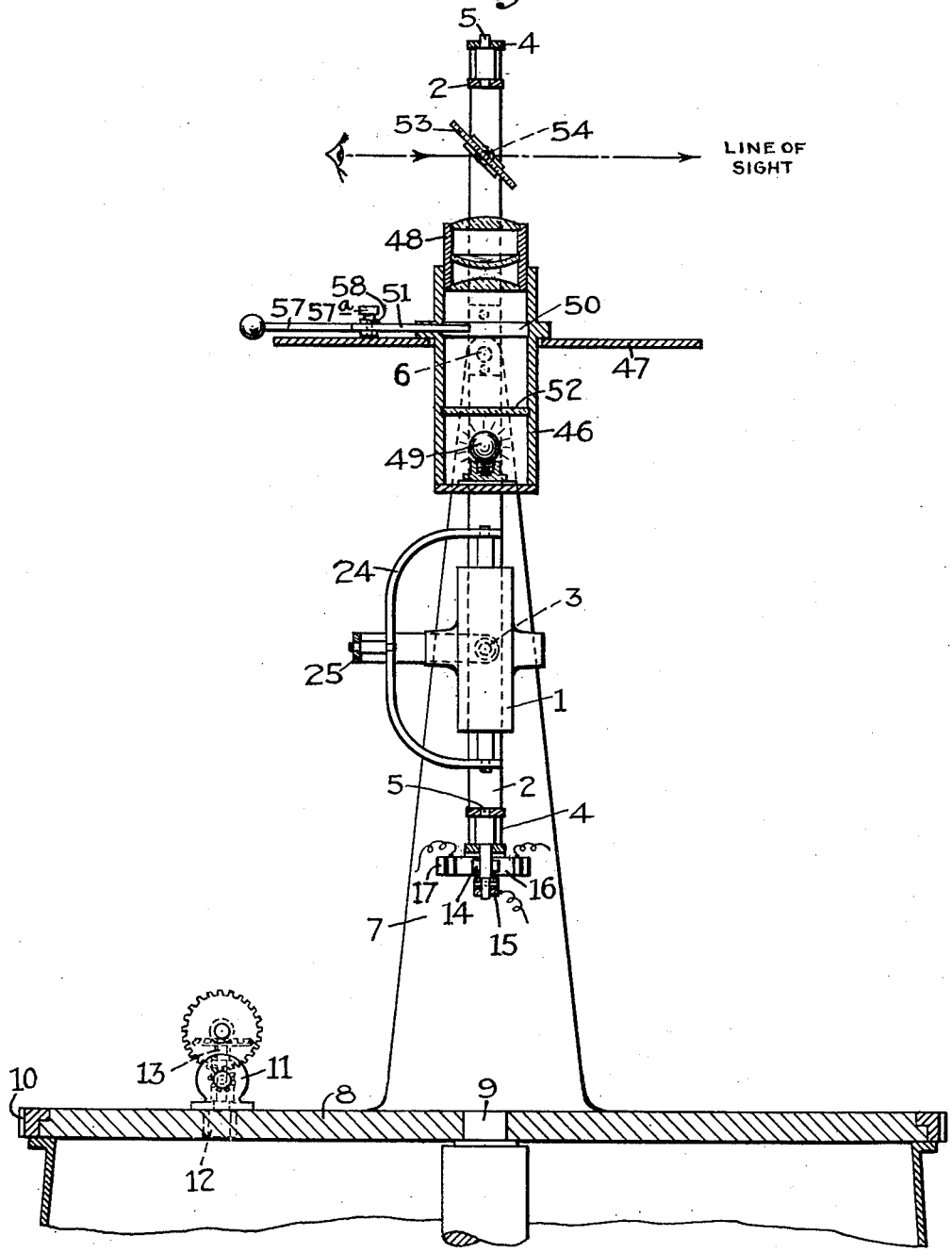

Patented July 20, 1954

2,684,007

UNITED STATES PATENT OFFICE 2,684,007

GYROSCOPICALLY CONTROLLED OPTICAL MECHANISM

William H. Newell, New York, N. Y., assignor to Ford Instrument Company, Inc., Long Island City, N. Y., a corporation of New York Application September 23, 1943, Serial No. 503,510

12 Claims. (Cl. 88—2.4)

This invention relates to automatic sighting devices such as are used in connection with ordnance in tracking a moving target, and particularly to a mechanism in which a gyroscope that is mounted in a gimbal system including a phantom ring so as to have three degrees of freedom, has rates applied to it in the form of precession forces so as to cause its spin axis to point at the target and follow it in its movement, and through follow-up means actuate the phantom ring to cause a sighting device to keep on the target.

More especially the invention pertains to that type of automatic sighting device in which the gyroscope tends to maintain a reference indication of some sort in the line of vision as an index to the operator of the correctness of the precession rates. Thus by regulating the precession forces the operator sets up rates both in train and in elevation which are used in computing the deflection angles, that is, the angles by which the gun must lead the sight, to take care, for example, of the movement of the target during the flight of the projectile.

It has been taught heretofore for this purpose to employ an optical projector mechanism that is stabilized by the gyroscope to project a visible image into the line of sight so that the observer may compare the movement of the image with that of the line of sight. A known form is a collimator which projects parallel rays from an image forming object, such as a reticle, upon a transparent but partially reflecting mirror through which the operator observes the target (see Barr and Stroud Patent No. 1,031,769), the mirror being positioned to reflect the rays from the collimator in a line parallel with the spin axis of the gyroscope. Thus the gyroscope has the right rates of precession if it keeps the image in the line of sight so that it appears to be coincident with the target.

One of the objects of this invention is to combine with such a system means to utilize the image of the projected reticle figure to determine the range of its target. By making the image of a size such that it exactly encompasses the target, the value of the angle subtended by the target can be known, and if the width or size of the target also be known, the distance or adjacent side of the triangle can be determined. Thus to use the image requires that its size be controllable.

To cause the projection of the collimator rays to remain stable relative to the spin axis of the gyroscope, the collimator system including the mirror may be mounted upon the casing of the gyroscope, as is taught in the Barr and Stroud patent above referred to. Force, however, must be applied to the image forming figure to vary its size, and it is manifest that the application of force to an element of a collimator mounted directly on the gyroscope will produce a reaction on the gyroscope which will cause it to wander. Such undesirable result from applying force to the image forming figure is avoided by the construction which this invention contemplates.

Another object of the invention is to mount the collimator and deflecting mirror relative to the phantom ring and the gyroscope so that inaccuracies in the action of the power drives in actuating the phantom ring will not cause erratic movement of the image from the collimator as viewed by the operator. This result is accomplished by mounting the collimator on the phantom ring and by controlling the movement of the reflecting mirror by the gyroscope so that regardless of the position of the phantom relative to the spin axis of the gyroscope the rays of the reflected image from the collimator remain parallel to the spin axis of the gyroscope.

In accordance with this invention, the collimator unit is mounted upon and carried by the power driven element of phantom ring of the gimbal mounting for the gyroscope, with the axis of the collimator in line with the pivot axis of the sensitive gimbal ring in which the gyroscope is mounted in the phantom. The inner or sensitive gimbal ring in which the gyroscope case is directly pivoted carries the partially reflecting mirror on a pivot axis parallel with that of the gyroscope case, and a suitable connection, such as linkage, operatively joins the two parallel pivots and causes the mirror to articulate at one half the elevation rate of the gyroscope relative to the inner gimbal ring. When the gyroscope is at zero elevation the mirror is at 45° to the horizontal. The collimator rays are therefore reflected parallel to the spin axis of the gyroscope, the mirror following the gyroscope in train at a 1 to 1 ratio and following it in elevation at a 1 to 2 ratio.

Since the image forming object in the collimator unit is required to be variable in size, it is convenient to employ an iris diaphragm for this purpose with the opening backed by an optically distinct body such as a light diffusing glass having a source of light behind it. With the collimator and iris mounted on the phantom ring, the reaction of the iris to the force applied to adjust the opening is upon the phantom ring or element and is extraneous of the gyroscope.

The mechanism shown in the drawings illustrates a simple way of carrying out the invention, it being understood that in practice means, not shown, are associated with the gyroscopically controlled optical follow-up mechanism here shown to utilize the rates.

Fig. 2 is a sectional elevation of the mechanism on the line 2—2 of Fig. 1.

Figure 1:
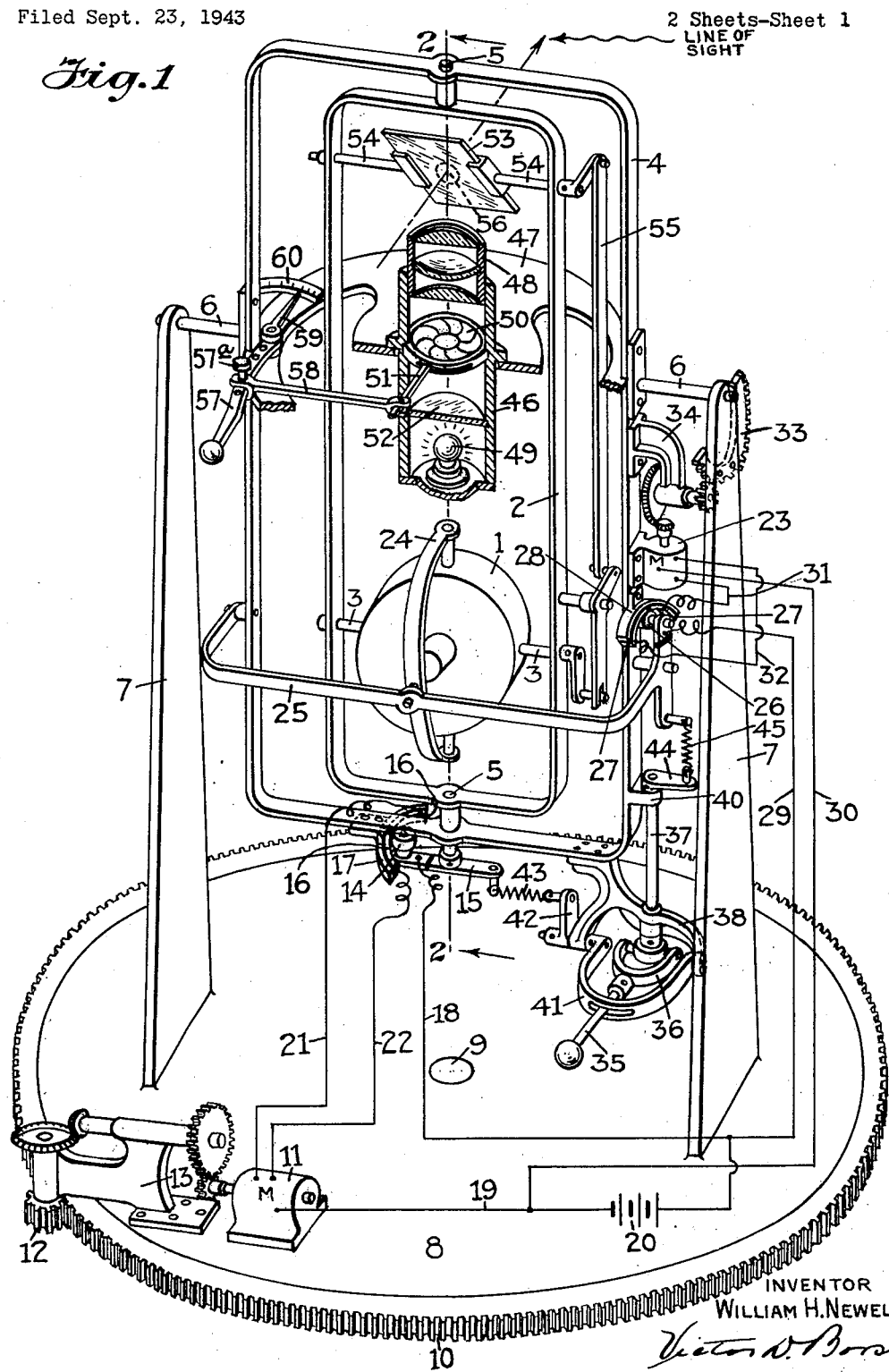
Fig. 1 is a diagrammatic perspective view of a mechanism embodying the invention.

The gyroscope 1 is mounted in the usual manner to have three degrees of freedom, the casing in which the gyroscope spins having a gimbal mounting so as to be free to elevate and train. Thus the spin axis has potentially a universality of movement. The gyroscope casing is pivoted in the inner or sensitive gimbal ring 2 on trunnions 3, 3 providing an elevation axis, and the sensitive ring 2 is pivoted in the outer or phantom gimbal ring 4 by trunnions 5, 5 providing a train axis at right angles to the axis 3, 3.

The phantom ring 4 is pivotally mounted by trunnions 6, 6 to pedestals 7, 7 on a turn table 8, trainable about the axis 9 inside a fixed circular rack 10. The phantom ring is trained and elevated to follow the gyroscope by follow-up motors the contacts of which are controlled by the gyroscope. The training motor 11 is mounted on the table 8 and operates a training pinion 12 through reduction gearing supported by a bracket 13 on the table. Thus as the motor 11 turns the pinion 12 the table is caused to turn in the rack. The motor 11 is shown as an electric motor and its contacts consist of a roller 14 on an arm 15 fixed on the lower trunnion 5, and two arcuate insulated contacts 16 carried by a bracket 17 on the phantom ring. The roller contact is connected to the motor by leads 18 and 19 through a current source 20 and constitutes the central connection, and the contacts 16 are connected to opposite ends of the field winding through leads 21 and 22 and thus constitute the reversing connections. Therefore relative movement of the rings 2 and 4 closes the motor circuit and causes the table 8 and hence the phantom ring 4 to train until the insulation between contacts 16 is brought on the roller 14. Thus the phantom ring is caused to follow the gyroscope in azimuth.

A motor 23 causes the phantom ring to follow the gyroscope in elevation. A bail 24 which is pivotally connected to the gyroscope case at points midway between the trunnions 3, is pivotally coupled to a bail 25 that is pivoted to the phantom ring 4. One end of the bail 25 has a bell crank extension which carries a contact roller 26 that cooperates with insulated arcuate contacts 27 on a bracket 28 on the phantom ring. The roller contact 26 is connected to the motor 23 through the current source 20 by leads 29 and 30, and the two contacts 27 are connected to the opposite ends of the field winding of motor 23 by leads 31 and 32. The motor 23 is mounted on the phantom ring 4 and is geared to an arcuate rack 33 on a pedestal 7 through a reduction double gear carried by a bracket 34 on the phantom ring. Thus relative movement of the gyroscope case about the axis 3, 3 moves bail 25 and the roller contact 26 and energizes motor 23 which rocks the phantom ring about its axis 6, 6 until the contact roller 26 is again on the insulated section between contacts 27. Thus the phantom ring and hence the sensitive ring 2 are caused to follow the gyroscope in elevation.

Manual means are provided to apply couples about the gyroscope axes 3, 3 and 5, 5 to cause the gyroscope spin axis to precess in azimuth and in elevation, respectively. The means shown comprise a handle 35 movable about right angle axes, and associated means to apply precessional torques proportional to its movement.

As shown, the handle 35 is attached to an inner yoke 36 pivoted on an elevation axis to the end of a shaft 37 that bears at its lower end in a bracket 38 on the phantom ring 4, and at its upper end in a boss 40 on the phantom ring. The shaft 37 thus constitutes the azimuth axis of the handle.

The handle 35 also passes through a slot in an outer yoke 41 that is pivoted in the bracket 38 on an elevation axis in line with that of the inner yoke. One of the pivots of the outer yoke has a radial arm 42 on its extension which is connected by a spring 43 to the end of the arm 15 opposite the roller contact 14. Similarly the shaft 37 has on its end a radial arm 44 which is connected by a spring 45 to a downward extension of the bell-crank arm that carries the contact roller 26.

By these means the handle 35 applies couples about the precession axes of the gyroscope 1, and the gyroscope is caused to precess in the direction of movement of the handle and at a rate proportional to the displacement of the handle. As the handle is moved about its elevation axis from its neutral position it extends the spring 43 and applies a force to the arm 15 which produces a torque on the sensitive ring 2 about its axis 5, 5 and so causes the gyroscope to precess about the axis 3, 3. Similarly as the handle is moved in the slot of yoke 41 about the axis of shaft 37, the shaft causes the radial arm 44 to extend the spring 45 and thus apply a torque to the bail 25 which through the bail 24 applies a couple about the gyroscope axis 3, 3 and causes the gyroscope to precess about the axis 5, 5. The follow-up means tends to maintain the axis 5, 5 in line with the train axis of the gyroscope.

The tubular housing 46 of the collimator is carried centrally and axially in a transverse plate 47 supported by and attached to the phantom ring 4 and cut out so as to accommodate the sensitive ring 2 and allow relative movement between the two rings. The collimating lens system 48 is in the outer end of the tube 46, and a lamp 49 is in the lower end. Between the lamp and the lenses is an iris diaphragm 50 having a radial arm 51 for operating the diaphragm and varying the size of the opening. Below the diaphragm is a diffusion glass 52. This glass will be close to the diaphragm although for clarity of illustration it is shown spaced some distance below it. It is this glass which constitutes the object of a size depending upon the extent of opening of the iris and the rays of which are rendered parallel by the lens system. Immediately above the collimator is a mirror 53 pivoted in the ring 2 on trunnions 54 on an axis parallel to the axis 3, 3. This mirror is partially silvered so as to be transparent and at the same time reflect rays striking it. A trunnion 54 is connected to a trunnion 3 by linkage 55 of the usual 2 to 1 ratio type so that angular movement of the trunnion 3 rotates trunnion 54 through half the angle. The linkage so connects the trunnions that the mirror is at an angle of 45° to the axis of the collimator when the train axis of the gyroscope and the axis 5, 5 are alined. Then any relative angular movement of the gyroscope about its elevation axis 3, 3 causes the mirror to move in elevation half as much. In this way the direction of reflection of the collimated rays is kept parallel to the spin axis of the gyroscope. This is parallel to the line of sight when the gyroscope is precessing at the right rates to keep its spin axis pointing at the observed target.

The reticle image permits the operator to check on the rates. The rays from the collimator strike the mirror and are reflected therefrom so as to appear as a bright spot or disc 56 the size of which depends upon the diaphragm opening. Due to the focusing of the reticle at infinity the image appears coincident with the observed target. By manipulating the size of the image so as to make it appear to coincide with the overall dimensions of the target, the range of a target of known dimensions is thereby determinable and can be indicated on a scale.

As an example of a way to do this, there is shown a range arm 57 pivoted on the plate 47 and having adjustable operative connection with the diaphragm operating arm 51. The connection shown is by link 58 pivoted to the outer end of arm 51 and connectable by a removable pin 57a to the arm 57 at points variously distant from the pivot of arm 57. The portion of the arm 57 along which the link is attachable is arcuate about the pivot connection to the arm 51 as a center when the range arm is adjusted to infinite range. A pointer 59 on the range arm cooperates with a range scale 60.

The connection of the link 58 with the range arm is set according to the known dimensions of the target. When the arm 57 is at its farthest setting to the left, the diaphragm opening is zero, thus representing infinity range. The rate at which the diaphragm opens as the arm 57 is rotated to the right depends upon the point of attachment of the link 58. One airplane, for example, may have a wing spread or fuselage length of 60 feet, another of 90 feet, another of 120 feet and another of 150 feet. The operator recognizes the plane and knows its dimensions. He sets the link connection accordingly. Then as the diaphragm is opened until the apparent image 56 just covers the plane, the pointer 59 will indicate the range on the scale 60.

By these means the force used to adjust the diaphragm opening reacts wholly upon the phantom ring and does not disturb the gyroscope, while the relative movement between the gyroscope and the collimator axis is taken care of by the adjustment of the mirror, so that the apparent image provides a reference for the line of sight, just as it would if the collimator and mirror were mounted directly on the gyroscope.

It is obvious that the principle of the invention as pointed out in the appended claims is substantially independent of the particular form of apparatus used to illustrate the invention.

I claim:

1. Gyroscopically controlled optical mechanism comprising a support mounted for freedom of movement about a train axis, a phantom member on the support constrained to move therewith in train and having relative freedom of movement in elevation, a sensitive frame member carried by the phantom member and having freedom of movement about an axis perpendicular to the elevation axis of the phantom member, a gyroscope pivotally mounted in the frame member on an axis perpendicular to the said axis of the frame member, servomotors for moving the phantom member in train and elevation, control means for the motors responsive to movement of the spin axis of the gyroscope about its two axes of freedom of movement relative to the phantom member, a collimator the axis of which is constrained coincident with the pivot axis of the frame member and which includes an axially disposed image forming figure, a mirror pivotally carried by the frame member upon an axis parallel to the pivot axis of the gyroscope in the frame member and positioned to reflect the collimated rays from the figure in a line parallel to the spin axis of the gyroscope, and means operatively connecting the parallel axes of the mirror and the gyroscope in a ratio to move the mirror through one-half the angular movement of the gyroscope.

2. Gyroscopically controlled optical mechanism comprising a support mounted for freedom of movement about a train axis, a phantom member on the support constrained to move therewith in train and having relative freedom of movement in elevation, a sensitive frame member carried by the phantom member and having freedom of movement about an axis perpendicular to the elevation axis of the phantom member, a gyroscope pivotally mounted in the frame member on an axis perpendicular to the said axis of the frame member, servomotors for moving the phantom member in train and elevation, control means for the motors responsive to movement of the spin axis of the gyroscope about its two axes of freedom of movement relative to the phantom member, means for applying controlled precession forces to the gyroscope about its said two axes, a collimator carried by the phantom member with its axis alined with the pivot axis of the frame member in the phantom member and including an axially disposed image forming figure, a mirror pivotally carried by the frame member upon an axis parallel to the pivot axis of the gyroscope in the frame member and positioned to reflect the collimated rays from the figure in a line parallel to the spin axis of the gyroscope, and means operatively connecting the paralel axes of the mirror and the gyroscope in a ratio to move the mirror through one-half the angular movement of the gyroscope.

3. Gyroscopically controlled optical mechanism comprising a support mounted for freedom of movement about a train axis, a phantom member on the support constrained to move therewith in train and having relative freedom of movement in elevation, a sensitive frame member carried by the phantom member and having freedom of movement about an axis perpendicular to the elevation axis of the phantom member, a gyroscope pivotally mounted in the frame member on an axis perpendicular to the said axis of the frame member, servomotors for moving the phantom member in train and elevation, control means for the motors responsive to movement of the spin axis of the gyroscope about its two axes of freedom of movement relative to the phantom member, means for applying controlled precession forces to the gyroscope about its said two axes, a collimator carried by the phantom member with its axis alined with the pivot axis of the frame member in the phantom member and including a source of light and a lens system, an iris diaphragm disposed between the source of light and the lens system with its center in the axis of the collimator and its plane perpendicular thereto, means to adjust the iris opening, a mirror pivotally carried by the frame member upon an axis parallel to the pivot axis of the gyroscope in the frame member and positioned to reflect the collimated light rays transmitted through the iris opening in a line parallel to the spin axis of the gyroscope, and means operatively connecting the parallel axes of the mirror and the gyroscope in a ratio to move the mirror through one-half the angular movement of the gyroscope.

4. Gyroscopically controlled optical mechanism comprising a support mounted for freedom of movement about a train axis, a phantom member on the support constrained to move therewith in train and having relative freedom of movement in elevation, a sensitive frame member carried by the phantom member and having freedom of movement about an axis perpendicular to the elevation axis of the phantom member, a gyroscope pivotally mounted in the frame member on an axis perpendicular to the said axis of the frame member, servomotors for moving the phantom member in train and elevation, control means for the motors responsive to movement of the spin axis of the gyroscope about its two axes of freedom of movement relative to the phantom member, means for applying controlled precession forces to the gyroscope about its said two axes, a collimator carried by the phantom member with its axis alined with the pivot axis of the frame member in the phantom member and including a source of light and a lens system, an iris diaphragm disposed between the source of light and the lens system with its center in the axis of the collimator and its plane perpendicular thereto, means settable according to the width of an observed object, means settable according to the distance of the observed object, means responsive to the two settable means for adjusting the iris opening, a mirror pivotally carried by the frame member upon an axis parallel to the pivot axis of the gyroscope in the frame member and positioned to reflect the collimated light rays transmitted through the iris opening in a line parallel to the spin axis of the gyroscope, and means operatively connecting the parallel axes of the mirror and the gyroscope in a ratio to move the mirror through one-half the angular movement of the gyroscope.

5. Gyroscopically controlled optical mechanism comprising a gyroscope and a gimbal mounting therefor, a collimator unit carried by the phantom member of the gimbal mounting and including an image forming figure, a partially reflecting mirror adjustably carried by the sensitive frame element of the gimbal mounting in position to reflect the collimated rays from said figure and a linkage connection between the gyroscope and the mirror operative to articulate the mirror to compensate for the movement of the axis of the collimator unit relative to the gyroscope.

6. Gyroscopically controlled optical mechanism comprising a gyroscope and a gimbal mounting therefor, means to apply controlled torques about the two mounting axes of the gyroscope to cause its spin axis to precess about the mounting axes, power means controlled by movement of the gyroscope about its mounting axes relative to the phantom member to cause the phantom member to follow the said movement of the gyroscope, a collimator unit carried by the phantom member of the gimbal mounting and including an image forming figure, a partially reflecting mirror adjustably carried by the sensitive frame element of the gimbal mounting in position to reflect the collimated rays from said figure, and a linkage connection between the gyroscope and the mirror operative to articulate the mirror to compensate for the movement of the axis of the collimator unit relative to the gyroscope.

7. Gyroscopically controlled optical mechanism comprising a gyroscope and a gimbal mounting therefor, a collimator unit carried by the phantom member of the gimbal mounting and including a source of light and a lens system, an iris diaphragm disposed between the source of light and the lens system with its center in the axis of the collimator and its plane perpendicular thereto, means to adjust the iris opening, a partially reflecting mirror adjustably carried by the sensitive frame element of the gimbal mounting in position to reflect the collimated rays transmitted through the iris opening, and a linkage connection between the gyroscope and the mirror operative to articulate the mirror to compensate for the movement of the axis of the collimator unit relative to the gyroscope.

8. Gyroscopically controlled optical mechanism comprising a gyroscope and a gimbal mounting therefor, means to apply controlled torques about the two mounting axes of the gyroscope to cause its spin axis to precess about the mounting axes, power means controlled by movement of the gyroscope about its mounting axes relative to the phantom member to cause the phantom member to follow the said movement of the gyroscope, a collimator unit carried by the phantom member of the gimbal mounting and including a source of light and a lens system, an iris diaphragm disposed between the source of light and the lens system with its center in the axis of the collimator and its plane perpendicular thereto, means to adjust the iris opening, a partially reflecting mirror adjustably carried by the sensitive frame element of the gimbal mounting in position to reflect the collimated rays transmitted through the iris opening, and a linkage connection between the gyroscope and the mirror operative to articulate the mirror to compensate for the movement of the axis of the collimator unit relative to the gyroscope.

9. Gyroscopically controlled optical mechanism comprising a gyroscope and a gimbal mounting therefor, a collimator unit carried by the phantom member of the gimbal mounting and including a source of light and a lens system, an iris diaphragm disposed between the source of light and the lens system with its center in the axis of the collimator and its plane perpendicular thereto, means settable according to the width of an observed object, means settable according to the distance of the observed object, means responsive to the two settable means for adjusting the iris opening, a partially reflecting mirror adjustably carried by the sensitive frame element of the gimbal mounting in position to reflect the collimated rays transmitted through the iris opening, and a linkage connection between the gyroscope and the mirror operative to articulate the mirror to compensate for the movement of the axis of the collimator unit relative to the gyroscope.

10. Gyroscopically controlled optical mechanism comprising a gyroscope and a gimbal mounting therefor, means to apply controlled torques about the two mounting axes of the gyroscope to cause its spin axis to precess about the mounting axes, power means controlled by movement of the gyroscope about its mounting axes relative to the phantom member to cause the phantom member to follow the said movement of the gyroscope, a collimator unit carried by the phantom member of the gimbal mounting and including a source of light and a lens system, an iris diaphragm disposed between the source of light and the lens system with its center in the axis of the collimator and its plane perpendicular thereto, means settable according to the width of an observed object, means settable according to the distance of the observed object, means responsive to the two settable means for adjusting the iris opening, a partially reflecting mirror adjustably carried by the sensitive frame element of the gimbal mounting in position to reflect the collimated rays transmitted through the iris opening, and a linkage connection between the gyroscope and the mirror operative to articulate the mirror to compensate for the movement of the axis of the collimator unit relative to the gyroscope.

11. Gyroscopically controlled optical mechanism comprising a gyroscope and a gimbal mounting therefor, a collimator unit carried by the phantom member of the gimbal mounting and including means for forming an image of variable size, means for adjusting the image forming means to vary the size of the image, a partially reflecting mirror adjustably carried by the sensitive frame element of the gimbal mounting in position to reflect the collimated rays forming said image, and a linkage connection between the gyroscope and the mirror operative to articulate the mirror to compensate for the movement of the axis of the collimator unit relative to tthe gyroscope.

12. Gyroscopically controlled optical mechanism comprising a gyroscope and a gimbal mounting therefor, means to apply controlled torques about the two mounting axes of the gyroscope to cause its spin axis to precess about the mounting axes, power means controlled by movement of the gyroscope about its mounting axes relative to the phantom member to cause the phantom member to follow the said movement of the gyroscope, a collimator unit carried by the phantom member of the gimbal mounting and including a means for forming an image of variable size, a partially reflecting mirror adjustably carried by the sensitive frame element of the gimbal mounting in position to reflect the collimated rays forming said image, and a linkage connection between the gyroscope and the mirror operative to articulate the mirror to compensate for the movement of the axis of the collimator unit relative to the gyroscope.

No. references cited.